Aug. 30, 1932.  H. C. FORD ET AL  1,874,094

TRANSMISSION SYSTEM

Filed May 11, 1926  2 Sheets-Sheet 1

Hannibal C. Ford,
Harry L. Tanner,
INVENTORS

BY Moakley and Gill,
ATTORNEYS

Aug. 30, 1932.  H. C. FORD ET AL  1,874,094
TRANSMISSION SYSTEM
Filed May 11, 1926   2 Sheets-Sheet 2

Hannibal C. Ford,
Harry L. Tanner
INVENTORS

BY Moakley & Gill
ATTORNEYS.

Patented Aug. 30, 1932

1,874,094

UNITED STATES PATENT OFFICE

HANNIBAL C. FORD, OF JAMAICA, AND HARRY L. TANNER, OF BROOKLYN, NEW YORK, ASSIGNORS TO FORD INSTRUMENT COMPANY, INC., OF LONG ISLAND CITY, NEW YORK, A CORPORATION OF NEW YORK

TRANSMISSION SYSTEM

Application filed May 11, 1926. Serial No. 108,327.

This invention relates to electrical transmission systems adapted to position an indicator or other element in accordance with the position of a remotely located element, and has for one of its objects to provide means for indicating with a high degree of accuracy the position of such remotely located element.

Another object of the invention, is to provide an indicator which will automatically obtain and maintain a constant angular relation with its transmitter and which will be automatically restored to synchronism when it has fallen out of step with its transmitter. This is particularly advantageous in signalling systems, since if the current should be suddenly interrupted when the transmitter is being moved to transmit signals to the receivers, synchronism between the transmitter and the receiver will be automatically restored when the current comes on.

A further object of the invention is to provide an extremely flexible and sensitive self-governing signalling system without the necessity of utilizing switches, make-and-break contacts, or auxiliary correcting mechanisms such as are commonly employed in transmission systems, and at the same time to provide a sturdy, rugged and smooth running system of transmission.

The above objects may be obtained by the provision of a coarse and fine reading synchronous transmission system in which the coacting armatures of the receiver are flexibly geared together in the same ratio that the coarse and fine transmitters are geared together and are severally connected to the transmitters. Accordingly, any variation in the predetermined relative angular relation or revolution ratio of the receiver armatures is utilized to actuate a governing mechanism, whereby one of the armatures is automatically disconnected from the polyphase operating line and is connected to a direct current line so as to rotate forward or backward as a direct current motor until it is restored to the predetermined angular relation or revolution ratio with the other armature which is being operated independently of its transmitter. The revolution ratio between the fine or high-speed receiver armature and the coarse or low-speed armature as well as between the fine and coarse transmitters may be, for the purpose of illustration, ten to one. It is understood that this ratio may be any other desired in practice, and, further, that a multiplicity of armatures may be used and similarly governed.

The system of this invention may utilize with advantage the synchronous transmitter disclosed in the copending application of Harry L. Tanner, Serial No. 724,912, filed July 8, 1924, for transmission system, and is illustrated in connection therewith. In this system the signal transmitter comprises a power-driven armature having a commutator and brushes contacting therewith mounted upon a movable ring encircling the commutator, so that when the ring, which also actuates a signal scale, is manually shifted in accordance with the signal indications, polyphase variable frequency currents are transmitted to the receiver circuits, the frequency of which varies in accordance with the angular velocity of the transmitter brushes. Thus, at zero angular velocity of the transmitter brushes the frequency is zero, resulting in a rectilinear current under which condition the receiver armatures are stationary, but when the transmitter brushes are shifted, the variable frequency currents which are accordingly set up, actuate the receiver armatures and the attached indicators accordingly. In applying such a transmitter to the system of this invention, two or more transmitters are geared together in a predetermined revolution ratio, at which the receiver armatures are also geared together.

The particularly nature of the invention together with other objects and advantages thereof, will appear more clearly from a description of a preferred embodiment thereof as illustrated in the accompanying drawings in which like reference characters designate like parts in the several views.

Figure 1:
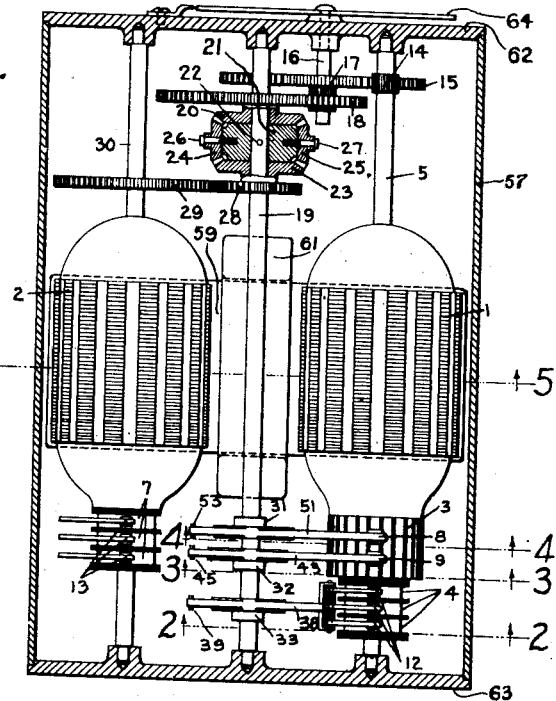
Fig. 1 is a longitudinal section of the receiving apparatus.

Referring particularly to Fig. 1, numeral 1 designates the high speed or fine receiving armature, while numeral 2 designates the low speed or coarse receiving controlling armature which is of similar construction. Armature 1 is provided with a commutator 3 as well as the slip rings 4 which are keyed to armature shaft 5 by means of key 6, while armature 2 has only the slip rings 7.

Figure 2:
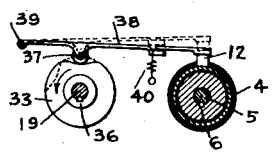
Fig. 2 is a transverse section along lines 2—2 of Fig. 1 showing the slip ring brush-actuating cam in its normal position.
Figure 3:
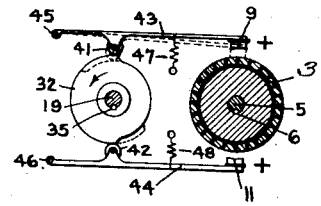
Fig. 3 is a transverse section along line 3—3 of Fig. 1 showing a pair of commutator brushes and their actuating cam in its normal position.
Figure 4:
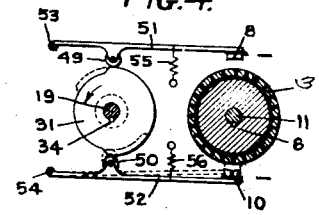
Fig. 4 is a transverse section along line 4—4 of Fig. 1 showing the other pair of commutator brushes and their actuating cam in its normal position.

One set of positive and negative commutator brushes of armature 1, designated 8 and 11, and another set designated 9 and 10, coact with the cams 31 and 32, and commutator 3, as shown in Figs. 3 and 4. The triple brush 12, contacting with slip rings 4 of armature 1, is arranged as shown in Figs. 1 and 2, the brushes 13 of armature 2 being similarly arranged on slip rings 7 but in permanent contact therewith instead of being variably connectable by means of a cam as in the case of slip ring brushes 12 of armature 1.

A pinion 14 is keyed to armature shaft 5 and rotates therewith to drive a large spur gear 15, which is mounted to drive an independent indicator shaft 16 to which is keyed the small pinion 17, which in turn drives a large spur gear 18 adapted to rotate freely on shaft 19, but which is integral with differential bevel gear 20. The spider 21 of the differential is securely attached to shaft 19 by means of pin 22 so as to rotate therewith. Meshing with bevel gear 20 and its corresponding bevel gear 23 are two equal bevel pinions 24 and 25, which are mounted to rotate freely upon spider 21 by means of pins 26 and 27 respectively. Spur gear 28, being integral with bevel gear 23, is free to rotate on shaft 19 and meshes with spur gear 29 which is keyed to shaft 30 of low speed armature 2. As aforementioned, the gear ratio between high speed armature 1, and low speed armature 2 is the same as the gear ratio between the corresponding transmitters and may be any ratio desirable for the purpose required.

It is evident that when armatures 1 and 2 are rotating at the proper revolution ratio, which corresponds to the angular position of their respective transmitters and to the speed reduction effected by the aforementioned gear train, shaft 19 will remain motionless since spider 21 is stationary under these conditions and the differential idles at the proper transmitted speed. But if there is any change in the revolution ratio it is evident that the gears of the differential will transmit a movement to shaft 19 through spider 21, and cams 31, 32, and 33 will turn since they are rigidly fastened to shaft 19 by means of keys 34, 35 and 36 respectively.

Referring to Fig. 2 cam 33 is shown in its normal position, i. e., when brushes 12 contact with slip rings 4. Any movement of shaft 19 causes cam 33 to revolve, which through cam follower 37, causes the lever 38 which is fulcrumed at 39 to lift brushes 12 from slip rings 4 against the tension of coil spring 40, which serves the dual purpose of holding the brushes 12 in contact with the slip rings 4 in the normal position of the cam as shown in Fig. 2, as well as to hold cam follower 37 in close contact with cam 33 when it is off normal position as shown in phantom in Fig. 2, which will occur when cam 33 is rotated in the direction of the arrow as well as in the reverse direction.

Referring to Fig. 3, cam 32 is shown in its normal position, i. e., when brushes 9 and 11 are free of commutator 3. Any movement of shaft 19 causes cam 32 to revolve, which, through cam followers 41 and 42, causes either one of levers 43 and 44, respectively, to make brushes 9 and 11, respectively, remain free or contact with commutator 3 of armature 1, depending upon which direction shaft 19 is turned by the differential. In any event, any movement of cam 32 causes either one of the positive brushes 9 or 11 to contact with commutator 3. Levers 43 and 44 are fulcrumed at 45 and 46, respectively, and are drawn against the cam 32 by means of coil springs 47 and 48, respectively, which also hold brushes 9 and 11 against commutator 2 whenever cam 33 releases either one of them. The phantom lines in Fig. 3 show the condition when cam 32 is turned counterclockwise in the direction of the arrow, thereby causing brushes 9 to contact with commutator 3 and maintaining brush 11 free of commutator 3.

Referring to Fig. 4, cam 31 is shown in its normal position, i. e., when brushes 8 and 10 are free of commutator 3. Any movement of shaft 19 causes cam 31 to revolve, which, through cam followers 49 and 50, causes either one of levers 51 and 52, respectively, to make one of the brushes 8 and 10 remain free of or contact with commutator 3 of armature 1, depending upon which direction shaft 19 is turned by the differential. In any event, any movement of cam 31 causes either one of the negative brushes 8 or 10 to contact with commutator 3. Levers 51 and 52 are fulcrumed at 53 and 54, respectively, and are held against cam 31 by means of coil springs 55 and 56, respectively, which also hold brushes 8 and 10 against commutator 3 whenever cam 31 releases either one of them. The phantom lines in Fig. 4 show the condition when cam 31 is turned counterclockwise in the direction of the arrow, thereby causing brush 10 to contact with commutator 3 and maintaining brush 8 free of commutator 3. Thus it will be seen that the operation of cams 31 and 32 is reversed, although they operate conjunctively, and that diametrically opposite brushes contact with the commutator at the same time, one positive and one negative, and, further, that the variable association of brush pairs 9 and 10 and 8 and 11 with opposite sides of the commutator has an effect similar to that attained in reversing the brush polarity of an ordinary motor. Although the brush reversal of the ordinary direct current motor causes a reversal of current flow in the armature to effect a speed retardation and finally a reversal in direction of rotation, it is apparent that in this invention there can be no complete reversal of the direction of rotation of armature 1 because the differential will act before that condition can take place and change brushes by means of the cams to return armature 1 to a synchronous motor as it reaches the rated revolution ratio.

In the event that the power is suddenly applied to the receiver motor after having been shut off, and the transmitter brushes have been advanced beyond the point registered by the receiver, the low speed armature will immediately fall into step, running synchronously, while high speed armature will run upon direct current until the proper revolution ratio is attained as hereinbefore described.

Cams 31 and 32 are shaped so that there is a momentary lapse of time between the lifting of slip ring brushes 12 from slip rings 4, and the contacting of commutator brushes 8 and 11 or 9 and 10 with commutator 3, so that there can be no short circuiting in armature 1. The momentum of the armature carries it past the dead center where both sets of brushes are free of the armature.

Figure 5:
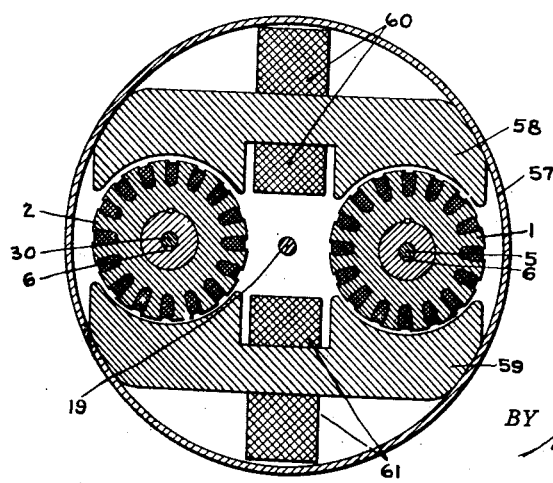
Fig. 5 is a transverse section along the line 5—5 of Fig. 1 showing a preferred compact arrangement of the several parts of the device.

Fig. 5 is a cross section of Fig. 1 along the line 5—5 and shows a compact arrangement of a two armature system wherein the armatures 1 and 2 are arranged on a diameter of a circular casing 57 shown in longitudinal section in Fig. 1, and the common field poles 58 and 59 are placed on either side and parallel to that diameter, and the field windings 60 and 61 are arranged as on a perpendicular diameter on the field poles 58 and 59. As shown in Fig. 1, shafts 5, 19 and 30 are journalled in the ends 62 and 63 of casing 57, whereas indicator shaft 16 projects through the end 62 and carries an indicator dial 64, whereby transmitted readings received by the motor are indicated through the medium of governed armature 1, which, by means of speed reducing gears 14, and 15, drives dial shaft 16. Accordingly an automatically corrected reading is indicated on dial 64.

Figure 6:
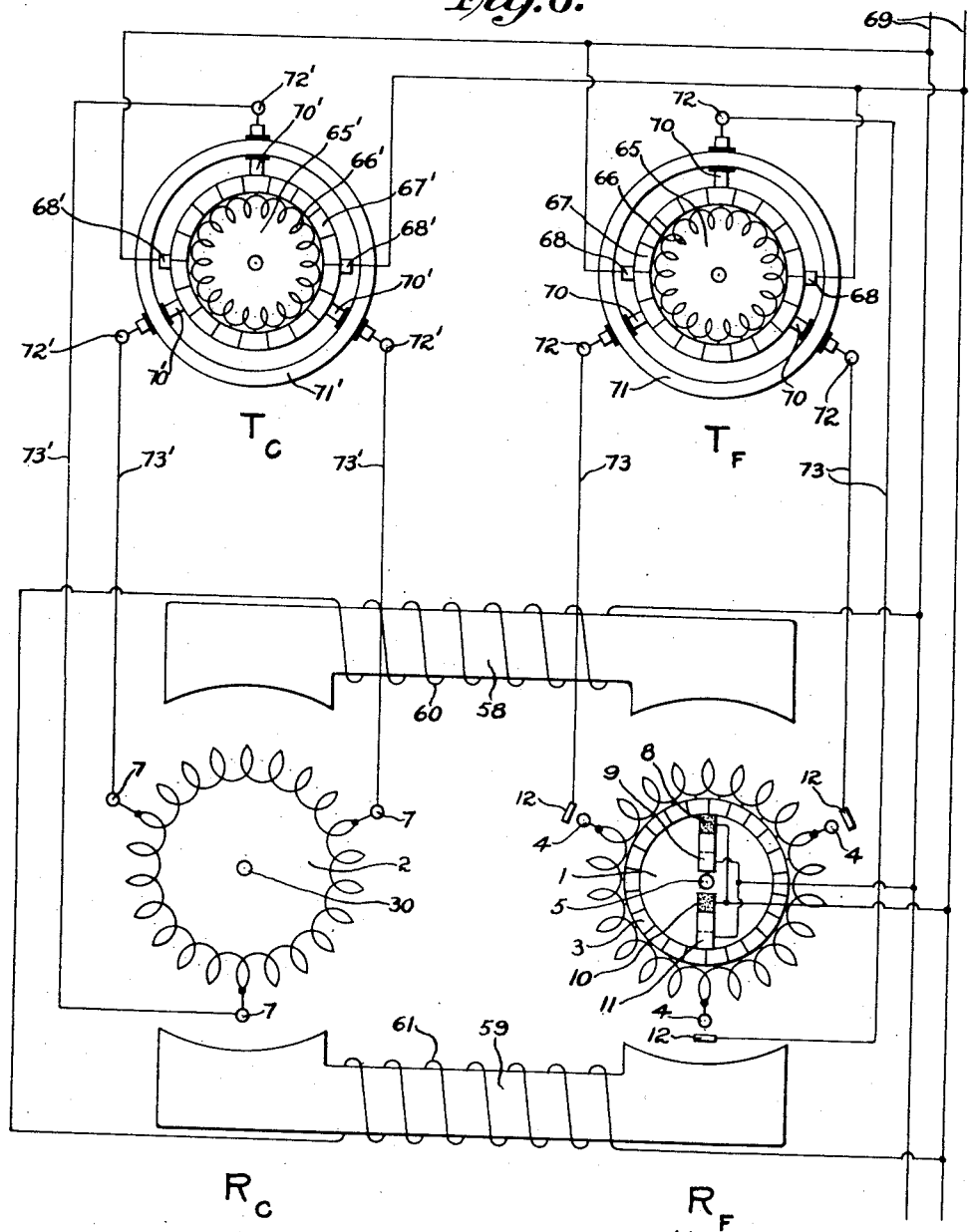
Fig. 6 is a schematic diagram of the transmission system.

Referring now to Fig. 6, in which a schematic diagram of the transmission system is illustrated as using coarse and fine transmitters which are designated generally by $T_C$ and $T_F$, respectively, whereas the coarse or low speed armature and the fine or high speed armature of the receiver motor are designated generally by $R_C$ and $R_F$, respectively. The gearing between the interconnected transmitters $T_C$ and $T_F$ and the gearing and cams of the receiving apparatus $R_C$ and $R_F$ have been omitted in Fig. 6, for the sake of clearness. Inasmuch as the transmitters $T_C$ and $T_F$ have identical parts, only one of them, $T_F$, will be described and therefore the other transmitter, $T_C$, will be given the same reference characters with the prime mark appended.

The transmitters comprise severally a power driven armature 65 consisting of winding 66 and a commutator 67, and which is mounted to rotate between suitable magnetic poles not shown. A pair of brushes 68 engage commutator 67, supplying it with direct current from supply lines 69. Engaging commutator 67 at points 120° apart, are three brushes 70 mounted on but insulated from ring 71 which is adapted to be rotated to shift brushes 70 with relation to commutator 67, which rotates relatively to the brushes 70, being power driven as aforementioned. Brushes 70 are severally connected to slip rings 72, shown by conventional symbols for the sake of simplicity.

The slip rings 72' of transmitter $T_C$ are permanently connected to the slip rings 7 of receiver armature $R_C$ or 2 by means of conductors 73', whereas the slip rings 72 of transmitter $T_F$ are connected by conductor 73 to brushes 12 which normally engage slip rings 4 of receiver armature $R_F$ or 1, when it properly follows the movements of the brushes 70 of its corresponding transmitter $T_F$, but brushes 12 may be disconnected from slip rings 4 in the manner hereinbefore explained and are so shown in Fig 6, whereas brushes 8 and 11 are shown engaging the direct current commutator 3, thus illustrating that armature 1 is operating as a direct current motor. Inasmuch as direct current brushes 8 and 11 are shown engaging commutator 3, direct current brushes 9 and 10 are disengaged therefrom as well as brushes 12 being disengaged from slip rings 4, which condition has been effected by the differential mechanism since the receiver armatures are assumed to be not in the same angular position as the brushes of the corresponding transmitters.

Having described the structure and principles governing the preferred embodiment of this invention, the particular operation thereof will now be further described in detail. Referring firstly to Fig. 6, if the operator rotates ring 71 of fine transmitter $T_F$, for example, to transmit a signal to one or more receiver units, coarse transmitter $T_C$, being geared to fine transmitter $T_F$, is also rotated, but at a lower speed by virtue of the reduction gearing. Accordingly, polyphase variable frequency currents are transmitted by transmitters $T_C$ and $T_F$ to synchronous receiver armatures $R_C$ and $R_F$, respectively, which accordingly turn through the same respective angles that the rings 71' and 71 or brushes 70' and 70 of the corresponding transmitters have been turned by the operator. Assuming that the transmitted movements are correctly received, the differential idles and its spider 21 and connected shaft 19 remain stationary, since the receiver armatures $R_C$ and $R_F$ are geared together at the same ratio that transmitters $T_C$ and $T_F$, respectively, are geared together, and accordingly operate independently as synchronous armatures.

If for any reason at all, a change in relative speed should occur whereby one armature falls out of step with its transmitter, it is evident that the differential will react to the change in the revolution ratio and its spider 21 will turn, whereby, as hereinbefore described, armature 1 ceases to be a synchronous armature by virtue of its slip ring brushes 12 being disconnected by the automatic action of cam 33, and instead becomes a direct current armature, since the direct current brushes 9 and 10 or 8 and 11 automatically made contact with the commutator 3 through the action of cams 31 and 32. By a proper radial adjustment of the cams, the direct current brushes are removed within approximately one-third of a revolution of the rated revolution ratio or near the angular position of the corresponding transmitter indicator for the purpose of safety, and the slip ring brushes 12 automatically reconnect with slip rings 4 while the direct current brushes are lifted from the commutator, and the armature again runs synchronously and in step with armature 2, the differential having acted to effect the change as armature 1 approached its intended angular position, or in other words, the angle equal to the angle of the transmitter indicator.

If the receivers are suddenly disconnected from the transmitters or the current is shut off while the transmitters are being operated, so that they indicate a different value than the last position of the receiver indicators, and then the current is again applied to the receivers or they are reconnected to their transmitters, the low-speed or coarse receiver $R_C$, being direct-connected to the low-speed or coarse transmitter $T_C$, will operate as an independent synchronous motor. Accordingly, the differential spider will be actuated to effect the disconnection of the slip ring brushes and cause the proper direct current brushes to be applied to the commutator high speed armature 1 which will then operate as a direct current motor until it is brought to approximately the same angular position as its corresponding transmitter, whereupon the differential effects the disconnection of the direct current brushes and the reconnection of the slip ring brushes in the manner above described.

While the specification and the accompanying drawings illustrate a preferred embodiment of this invention, it is to be understood that modifications in form and detail may be freely made without departing from the spirit of the invention within the scope of the appended claims.

What is claimed is:

1. In an electrical transmission system, the combination of a plurality of transmitters, a plurality of receivers electrically connected severally thereto, and means controlled jointly by said receivers including a circuit changing mechanism for one of said receivers for maintaining said receivers in the same angular relation as said transmitters.

2. In an electrical transmission system, the combination of a plurality of receivers, a transmitter for each receiver, circuits between the transmitters and the receivers and means controlled jointly by said receivers for closing another circuit through one of said receivers.

3. In an electrical transmission system, a receiver including a plurality of armatures, a transmitter for each of said armatures, and means controlled jointly by said armatures for separately energizing one of them to maintain the armatures in synchronism with their respective transmitters.

4. In an electrical transmission system, a plurality of receivers adapted to be severally electrically connected to a plurality of transmitters and including normally inoperative power means, and means controlled jointly by said receivers for connecting said power means to one of the receivers.

5. In an electrical transmission system, the combination of a plurality of receiver members, a transmitter member electrically connected to each receiver member, and means including a separate source of power and controlled jointly by said receiver members for maintaining the receivers in the same angular relation as their respective transmitter members.

6. In an electrical transmission system, a receiver motor adapted to be electrically connected with a transmitter, and means for breaking the connection between said receiver and transmitter when they are out of step with each other and making said connection when they are in step, an armature connected to and cooperating with the receiver motor and controlled synchronously by and with said transmitter to actuate said breaking and making means.

7. In an electrical transmission system, the combination of a plurality of transmitters and a source of electrical supply, a plurality of receiver motors adapted to be revolved through definite relative angles by said transmitters, means for bringing one motor into the definite angular relation with the other motor and its respective transmitter, said means including a separate source of power and means to connect one of said motors to one or the other of said sources according to the condition of the angular relation of said motors.

8. In an electrical transmission system, a source of power, a plurality of electric receiver motors adapted to be driven from said source at different speeds, a selecting device jointly controlled by said motors and adapted to temporarily disconnect one of said motors from said source and connect it with a different power source upon a relative speed change, said device being adapted to reconnect said disconnected motor to the first source of power when it is restored to its predetermined speed.

9. In an electrical transmission system, a variable frequency synchronous motor having a plurality of armatures, a transmitter for each of said armatures, a source of direct current, one of said armatures being adapted to operate from said source, and differential gearing connecting said armatures, said gearing adapted to automatically connect and disconnect said one armature to and from the direct current source during relative speed changes between one of said armatures and its transmitter.

10. In an electrical transmission system, a multi-armature synchronous receiver motor, a commutator for each armature of the motor, an auxiliary commutator on one armature, brushes adapted to coact with said auxiliary commutator, differential gearing connecting the shafts of the armatures, and cams operable by said differential gearing, said cams arranged to temporarily connect said brushes to said commutator.

11. In an electrical transmission system, a receiver comprising a two-armature synchronous motor slip rings for both armatures, an auxiliary commutator adjacent the slip rings of one of the armatures, a differential gear train between the armatures, a shaft attached to the spider of said differential, cams mounted on said shaft, and two sets of brushes operable by said cams to alternately coact with the respective commutator and the slip rings of said one armature as the changes in the angular relations of said armatures actuate said differential.

12. In an electrical transmission system, a synchronous motor comprising two armatures, brushes for the armatures one of said armatures adapted to operate at a relatively high speed and the other armature adapted to operate at a relatively low speed, an auxiliary direct current commutator on the high speed armature, brushes for the commutator, a gear train connecting said armatures a differential in said gear train, a shaft integral with the spider of said differential, and cams on said shaft adapted to alternately disconnect and connect the brushes of said high speed armature and the brushes of said commutator respectively as a change in the revolution ratio between said armatures actuates said differential.

13. In an electrical transmission system, a receiver comprising a two armature synchronous motor, one of said armatures having a commutator, a source of direct current and a revolution governor controlled by said armatures, said governor adapted to temporarily disconnect said one armature and connect said commutator to the source of direct current thereby causing said armature to operate on direct current to adjust its speed, whereupon said governor reconnects said one armature and disconnects said commutator.

14. A variable frequency current motor comprising two armatures, one of said armatures having an auxiliary direct current commutator, normally disconnected brushes therefor, a governing mechanism interposed between said armatures, said mechanism operable by a change in the relative speed of said armature, and means operated by said mechanism for disconnecting said one armature and connecting said commutator and brushes, said mechanism operating to restore said motor to its normal operation when the rated revolution ratio between said armature is attained.

15. A synchronous motor having a plurality of armatures, one of said armature having an auxiliary commutator, a source of direct current, epicyclic gearing connected to said armatures, cams operated by said gearing, and auxiliary brushes connected to said source and actuated by said cams whereby said one armature operates temporarily as a direct current armature.

16. In a multi-armature synchronous motor, a commutator on one of the armatures, a governing device connecting the armatures comprising a differential gearing sensitive to changes in their angular relation, cams operable by said gearing, and auxiliary brushes actuable by said cams, said brushes operative to simultaneously connect and disconnect said commutator and disconnect and connect said one armature.

17. A synchronous motor comprising a plurality of armatures, one of said armatures being adapted to operate on direct current, and differential gearing connecting said armatures, said gearing adapted to automatically connect and disconnect one armature to and from an auxiliary direct current source during changes in the relative angular relation between said armatures.

18. A multi-armature synchronous motor having a common magnetic field, an auxiliary commutator on one armature, brushes adapted to coact with said commutator, differential gearing connecting the shafts of the armatures, and cams operable by said gearing, said cams arranged to temporarily connect said brushes to said commutator.

19. A synchronous motor comprising two armatures having a common magnetic field, an auxiliary commutator adjacent the slip rings of one of the armatures, a gear train between the armatures, a differential in said gear train, a shaft attached to the spider of said differential, cams mounted on said shaft, and two sets of brushes operable by said cams to alternately coact with said commutator and the slip rings of said one armature as a change in the relative angular position of one armature varies the position of said differential.

20. A synchronous motor having two armatures normally operable at a constant revolution ratio, one of the armatures being selectively operable on direct current, and a mechanical governor adapted to disconnect said one armature and connect it temporarily to a direct current line, said governor also adapted to reconnect said one armature and disconnect the direct current line therefrom whereby said revolution ratio is maintained constant.

21. In an electrical transmission system, a pair of transmitters, a pair of receiver motors actuated from the transmitters, one of said motors being adapted to carry the load, means under the control of the other motor for converting the load carrying motor into a Servo motor when the load carrying motor differs by a predetermined amount from synchronism with its transmitter and for restoring it to its condition as a synchronous motor when it differs from synchronism with its transmitter by less than the predetermined amount.

22. In an electrical transmission system, a transmitter member, a receiver motor connected thereto and having a plurality of armatures adapted to be driven in a predetermined speed relation with each other, electrical connections between the transmitter member and armatures, a differential gear connected to said armatures, main brushes for the armatures operable by said gear, a source of direct current, and auxiliary brushes for one armature actuated by said cams whereby it is operable temporarily as a direct current armature.

23. In an electrical transmission system, the combination with a source of electromotive force of a plurality of receiver motors adapted to be driven therefrom at a predetermined speed relation, and means for maintaining the motors in such speed relation including a separate power source and means to connect part of said motors thereto upon interruption of the predetermined relation of said motors.

24. In a transmission system, a plurality of transmitters adapted to bear different angular relations, a plurality of receivers severally connected to said transmitters and adapted to bear the same respective angular relations, each of said receivers being adapted to operate throughout the period of operation, and means operative by a change in the angular relation of said receivers for restoring that angular relation, said means being actuated by the joint operation of said receivers and effective on one of them.

25. A dynamo-electric machine comprising a plurality of armatures adapted to normally operate at a predetermined speed ratio and having a common magnetic field, one of said armatures normally operable on one current source and having auxiliary means adapted to operate on a different current source, and mechanical revolution governing means operable by gearing between said armatures to temporarily effect the operation of said one armature on the different current source upon variation of the speed ratio to reestablish the predetermined value of said ratio.

In testimony whereof, we have affixed our signatures.

HANNIBAL C. FORD.
HARRY L. TANNER.